United States Patent [19]

Reeves et al.

[11] 4,101,859

[45] Jul. 18, 1978

[54] MAGNETIC PICK UP FOR USE WITH ELECTRONIC IGNITION SYSTEMS

[75] Inventors: George I. Reeves; Jack J. Keegan, both of Fullerton, Calif.

[73] Assignee: Beckman Instruments, Inc., Fullerton, Calif.

[21] Appl. No.: 768,004

[22] Filed: Feb. 11, 1977

Related U.S. Application Data

[63] Continuation of Ser. No. 635,742, Nov. 26, 1975, abandoned.

[51] Int. Cl.² ............................................ H01F 27/02
[52] U.S. Cl. .................................. 336/90; 324/16 R; 324/170; 336/DIG. 2
[58] Field of Search .................... 336/90, 92, DIG. 2, 336/221; 324/16 R, 16 S, 16 T, 15 R, 170; 123/148 E

[56] References Cited

U.S. PATENT DOCUMENTS

| | | | |
|---|---|---|---|
| 2,379,664 | 7/1945 | Stanko | 336/DIG. 2 X |
| 3,456,245 | 7/1969 | Fujitsubo | 336/DIG. 2 X |
| 3,549,990 | 12/1970 | Hochheiser | 336/DIG. 2 X |
| 3,550,682 | 12/1970 | Fowler | 336/DIG. 2 X |
| 3,641,336 | 2/1972 | Boin | 336/DIG. 2 X |
| 3,811,089 | 5/1974 | Strelewicz | 324/170 |
| 3,908,622 | 9/1975 | Long | 123/148 E |

OTHER PUBLICATIONS

Build your own "Wireless" Tach., Ronald M. Benrey, Popular Science, Mar. 1965.

*Primary Examiner*—Thomas J. Kozma
*Attorney, Agent, or Firm*—R. J. Steinmeyer; P. R. Harder

[57] ABSTRACT

An improved automotive ignition analyzer is provided for use with electronic ignition systems. A quadrature field magnetic pickup is utilized to detect signals in the secondary circuit of the ignition system. An adaptor including a voltage clamp is connected to the tachometer lead of the electronic ignition system so that a power balance test may be performed in the conventional manner without harming the electronic ignition system.

2 Claims, 3 Drawing Figures

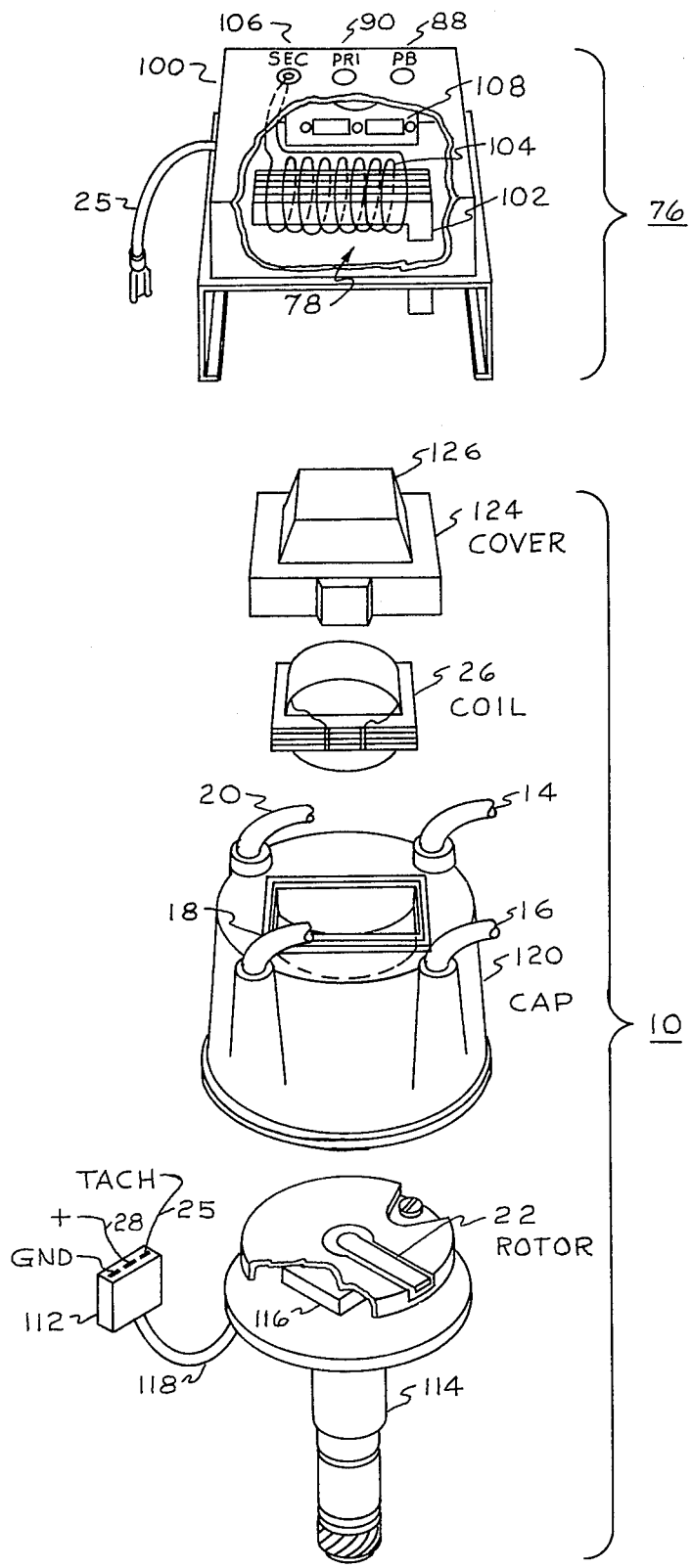
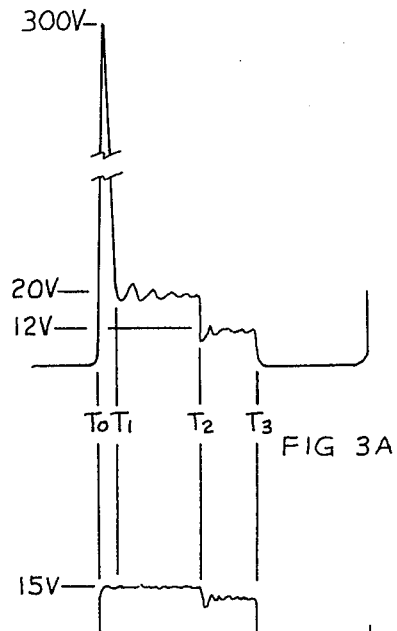
FIG 2
FIG 3A
FIG 3B
FIG 3

MAGNETIC PICK UP FOR USE WITH ELECTRONIC IGNITION SYSTEMS

This is a continuation of application Ser. No. 635,742, filed Nov. 26, 1975, now abandoned.

BACKGROUND OF THE INVENTION

1. Field of the Invention

The instant invention relates to improved ignition analyzers for multi-cylinder internal combustion engines and, in particular relates to improvements therein permitting the use of such analyzers with electronic ignition systems.

2. Description of the Prior Art

Ignition analyzers for use with multi-cylinder internal combustion engines are well known in the art. Conventional ignition analyzers may be considered to include a tachometer drive and display, a cathode ray oscilloscope drive and display and a power balance test circuit. The test circuit conventionally includes: (a) a counter for identifying the individual cylinder firings; (b) a switch for selecting a particular cylinder to be disabled and (c) a selectively operable shorting circuit controlled by the counter through the selector switch to disable the ignition system during the normal firing time of the cylinder selected. This power balance test circuit is normally utilized by selecting a particular cylinder and by observing the tachometer reading before and after disabling that cylinder so that the effect on engine performance of the normal operation of the cylinder selected, in terms of engine speed, may be determined.

These conventional analyzers require a first probe connected to a preselected cylinder, such as cylinder No. 1, for resetting the counter and second and third probes connected to the primary and secondary circuits of the ignition coil in order to display the signals developed therein and also to provide the count input for the counter. The shorting circuit is connected to the ungrounded side of the points. When the shorting circuit is actuated by the counter, the ungrounded side of the points is grounded by the shorting circuit so that the points effectively never open. The energy in the coil is therefore not discharged through the spark plug selected. The probe connected to the secondary circuit is normally a magnetic pickup positioned around the high tension lead between the primary side of the coil and the center of the distributor.

Such conventional analyzers cannot be used to analyze some of the recently developed electronic ignition systems such as the General Motors Corp., HEI, or high energy ignition system. In such systems the ignition coil is positioned within the distributor cap so that the secondary circuit is not readily accessible for signal detecting purposes and the points are replaced by a transistorized ignition circuit. Although a connection to the collector of this transistor is made accessible for connection to the engine tachometer, the remaining components are protected by covers. This prevents convenient access by the mechanic to connect probes associated with the analyzer. The power balance connection to the analyzer, which shorts the points to ground during the firing of the cylinder to be balanced, cannot be connected directly to the tachometer lead without harming the internal circuitry of the electronic ignition systems. Further details of the electronic ignition systems described above are not necessary for an understanding of the instant invention.

SUMMARY OF THE INSTANT INVENTION

The instant invention provides a housing which may be affixed to the outside of the distributor cap of an electronic ignition system. This housing includes an L-shaped core and magnetic winding thereon which is positioned by the housing to be in the quadrature field of the ignition coil to develop signals related to the secondary circuit of the ignition system. Further, a voltage clamp is provided, one side of which may be connected to the tachometer output of the electronic ignition system and the other side of which may then be connected to the power balance probe from the analyzer so that a conventionally configured analyzer may be utilized to power balance an electronic ignition system without causing malfunctions of the ignition system.

BRIEF DESCRIPTION OF THE DRAWINGS

FIG. 2 is an exploded view of an electronic ignition system distributor and the housing containing the circuitry and secondary probe of the instant invention;

FIG. 3 includes graphs 3A and 3B which show, respectively, the primary circuit display for an individual cylinder under normal operating conditions and the same display during a power balance test.

DETAILED DESCRIPTION OF A PREFERRED EMBODIMENT

Figure 1:
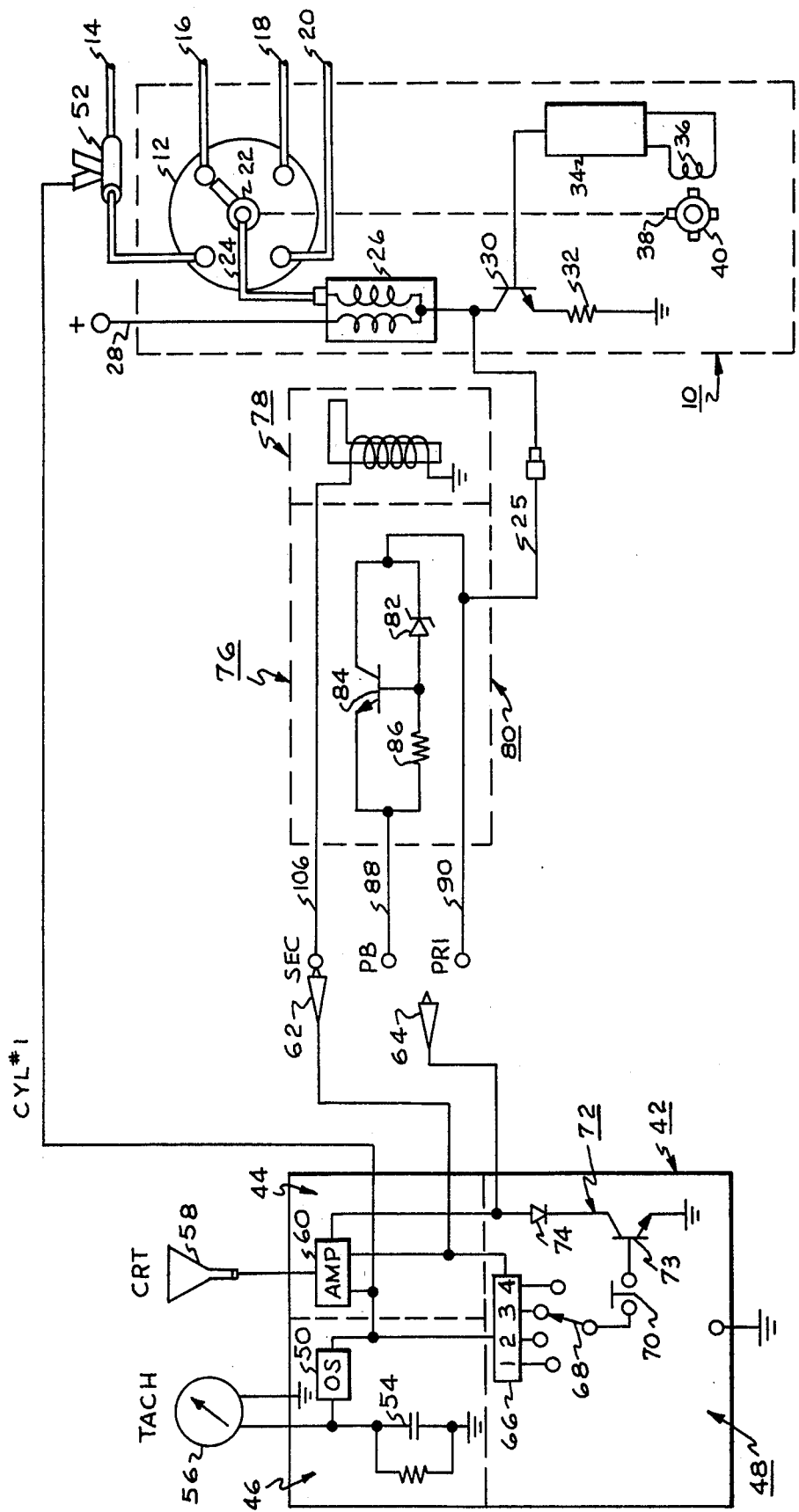
FIG. 1 shows in symbolic form a typical electronic ignition system, a conventional ignition analyzer including both power balance and oscilloscopic display and an adapter according to the instant invention including both a quadrature field magnetic pickup probe and a voltage clamp adapter for the power balance circuit.

FIG. 1 shows an electronic ignition system 10 including a distributor 12 having leads 14, 16, 18 and 20 for connection to spark plugs for cylinders No. 1, 2, 3 and 4, respectively, of an internal combustion engine such as an automobile engine.

Contained within distributor 12 is rotor 22 which distributes the energy present in secondary circuit high tension lead 24 of ignition coil 26. The primary side of coil 26 is connected by battery lead 28 to the battery of the engine. The common side of ignition coil 26 is connected to the collector of pass transistor 30 which is connected through emitter resistor 32 to ground. The base of transistor 30 is operated by circuitry 34 in the manner generally of the mechanical points of a conventional ignition system so that pass transistor 30 is caused to stop conducting when coil 26 is required to cause a spark plug to ionize. Circuitry 34 includes a magnetic or optical pickup 36 which detects indicia 38 on rotating cam shaft 40 in order to synchronize the operation of pass transistor 30 with that of rotor 22.

The above described electronic ignition system, with the exception of spark plug cables 14, 16, 18 and 20, is provided in a housing access to which is limited to a three wire cable containing a ground connection, battery lead 28 and tachometer lead 25 which is connected to the common point of coil 26 and therefore the collector of transistor 30. While the connection to the coil-collector common point has been referred to herein as the tachometer lead or output, it should be understood that such designation is not essential and in other ignition systems may be referred to by other nomenclature, such as, the primary output. What is important is that this connection be made to a common point between the coil and transistor so that the coil energy may be dissipated without damage to the system. Lead 25 is connected to a tachometer display system, not shown, associated with the engine and used to indicate the rotational speed thereof. It is important to note that secondary high tension lead 24 is enclosed within the housing so that it is not readily accessible for connection to an ignition analyzer.

The electronic ignition system described above has been developed for improved gas mileage, reduced emissions and other reasons associated with the efficient operation of the engine. These designs do not allow connection to conventional automotive ignition analyzers, such as analyzer 42 shown in FIG. 1. Such analyzers are usually of fairly complex design including many circuits and features not relevant to the instant disclosure. For the purposes herein, conventional analyzer 42 is shown to include oscilloscopic display section 44, tachometer section 46 and power balance section 48.

Tachometer section 46 includes one shot 50, which receives as an input the ignition signal developed in cylinder No. 1 as detected by probe 52. The output of one shot 50 is integrated in capacitor 54. The voltage impressed across capacitor 54 is therefore representative of the speed of the internal combustion engine, not shown, and is displayed in meter 56 as a tachometer reading.

The oscilloscopic display section 44 includes cathode ray oscilloscope 58 and signal processing circuitry 60 which receives as an input the signals detected by cylinder No. 1 probe 52, the signals developed in the secondary circuit as detected by secondary probe 62, and the signals developed in the primary circuit as detected by primary probe 64. Circuitry 60 includes amplifiers, switches and other circuits in a conventional configuration.

The power balance section of analyzer 42 includes a counter 66 receiving as a count input the ignition signals in the secondary circuit of the ignition system so that counter 66 counts every time any one of the cylinders is fired. In an alternate arrangement, counter 66 may receive as an input the ignitions signals in the primary circuit of the ignition system. In either arrangement, if a four-cylinder engine is being tested, counter 66 will include four output states. Counter 66 receives as a reset input the signals impressed on a particular cylinder, for convenience called cylinder No. 1, so that each of these four output states may be associated with a particular cylinder. These output states are connected to selector switch 68 which is operated by the mechanic or other ignition analyzer user to choose one of the cylinders by selecting one of the output states of counter 66. The output state selected is connected through power balance switch 70, when actuated, to the control input of shorting circuit 72. This circuit is connected to the primary of the ignition system by probe 64. Shorting circuitry 72 is shown to include transistor 73 and high energy diode 74. When power balance switch 70 is actuated, circuitry 72 is used to short circuit the points of the engine during the normal firing time of the cylinder selected by switch 68. When switch 70 is not actuated, all cylinders are operated normally.

Various details of the circuitry of analyzer 42 have not been shown but include, for example, circuitry to allow analyzer 42 to be used with engines having other than four cylinders, circuitry for developing a substitute cylinder No. 1 pulse for counter 66 for use when the ignition of cylinder No. 2 is disabled by shorting switch 72, pulse shaping and amplifying circuitry and various other improvements for displaying and measuring other functions of the invention.

The improvement for analyzer 42 according to the instant invention, includes adapter 76 having secondary probe section 78 and voltage clamp 80 all mounted within a mechanical housing shown in FIG. 2.

Voltage clamp 80 may include zener diode 82 and power transistor 84 together with resistor 86 in a conventional configuration to improve the power handling capabilities of diode 82. Clamp 80 is connected between power balance lead 88 and tachometer lead 25. In this manner, when power balance pushbutton 70 is operated, the output state of counter 66 selected by switch 68 causes shorting circuit 72 to ground points probe 64, thereby grounding clamp 80. This clamps tachometer lead 25 to the voltage determined by zener diode 82 during the normal firing time of the cylinder selected.

For display purposes, when the power balance test is not being performed, points probe 64 may be connected to primary lead 90 in order to connect tachometer lead 25 to signal processing circuitry 60. Switching between leads 88 and 90 may be accomplished by a switch or conveniently by moving probe 64 physically from lead 88 to lead 90.

Secondary probe section 78 contains an L-shaped electromagnetic core of the proper size to fit against the circumference of the housing for ignition coil 26. An L-shaped section was chosen in order to maximize the available flux linkage for the probe. For convenience the core shape may also be semicircular. Because of the physical arrangements of the housings an L-shaped core in the quadrature field of the coil provides a better signal than a straight core in the direct flux path. The quadrature magnetic field of coil 26 is perpendicular the major magnetic field which runs parallel to the core of the coil. One leg of the L-shaped core is wrapped with a pickup coil which may conveniently be 1,000 turns of No. 41 wire. The physical configuration of the above-described devices may best be understood with reference to FIG. 2.

FIG. 2 shows in pictorial form an electronic ignition system 10 and adapter 76 in an exploded view arrangement. Adapter 76 includes housing 100 which has been partially cut away to show secondary probe section 78 which includes L-shaped core 102 and winding 104. One end of winding 104 is connected to one terminal of coaxial connector 106 which is the point to which secondary pickup lead 62 of analyzer 42 is connected while the other end of winding 104 is connected to the other terminal of coaxial connector 106 which in turn is connected to engine ground. Also contained within housing 100 is circuit board 108 upon which are mounted the electronic components of clamp 80. Post 90 and post 88 are the connection points for the primary lead and the power balance lead as described above and are connected to the circuitry on board 108. Also connected thereto is tachometer lead 25 which may be connected into the tach input position of connector 112.

Electronic ignition system 10 includes rotor base 114 mounted in which is rotor 22 and electronic circuitry 116 which includes pass transistor 30 and the associated circuitry as shown in FIG. 1. Cable 118 is connected to this circuitry and is terminated in connector 112 described in part above. Mounted upon housing 114 is distributor cap 120 to which are connected spark plug wires 14, 16, 18 and 20.

Coil 26 is mounted in a cavity in the upper surface of cap 120 and is covered by distributor cover 124 which protects the remainder of the ignition system from the environment. Cover 124 includes a molded portion 126 which fits around coil 26.

Housing 100 is designed so that it may be mounted upon cover 124 so that L-shaped core 102 partially surrounds coil 26. Core 102 thereby interrupts the flux lines of the quadrature field of coil 26.

The operation of these devices may be clearly seen with reference to FIGS. 3A and 3B. FIG. 3A is a graphical representation of the oscilloscope trace shown on oscilloscope 58 for the signal developed in the primary circuit of the ignition system as detected by probe 64 connected to lead 90. At time $T_0$ pass transistor 30 is caused to stop conducting by circuitry 34 so that coil 26 discharges its energy through rotor 22 into the appropriate spark plug. This results in a 300 to 400 volt spike in the primary circuit as illustrated in FIG. 3A. At time $T_1$ at the end of the initial spike, the voltage across the spark plug gap decays to a point where approximately 20 volts is impressed on the primary circuit, the level at which ionization is sustained. At time $T_2$ the energy is insufficient to sustain ionization and the voltage at the primary drops to the battery voltage of approximately 12 volts. At time $T_3$ the voltage drops to approximately zero when transistor 30 again is caused to conduct.

During a power balance test of the cylinder represented in FIG. 3A, probe 64 would be connected to lead 88. The voltage displayed on oscilloscope 58 would appear as shown in FIG. 3B. Rather than tying lead 25 to ground, clamp 80 serves to limit the voltage at the common point of the coil to 15 volts, which is sufficient to allow coil 26 to discharge through clamp 80 and shorting circuit 72 but insufficient to cause ionization of the gases within the cylinder. In this manner an electronic ignition system may be power balance tested without causing damage thereto.

Although a preferred embodiment of the instant invention has been disclosed herein, it must be understood that modifications may be made to the design shown herein without departing from the spirit or scope of the invention. For example, the details of the circuitry of analyzer 42 may be altered to provide additional functions and measurements or for special purpose test equipment. The power balance test function may be provided in a device without the capability of oscilloscopic display and vice versa. Further, various different forms of electronic ignition systems may require modifications of the general structure of the adapter and housing. Moreover, the voltage clamp need not be housed in the adapter but may be made a part of the ignition analyzer with appropriate switch performed when the analyzer is utilized in connection with older, point type ignition systems and the newer electronic ignition systems.

What is claimed is:

1. Apparatus for coupling an internal combustion engine ignition analyzer to an electronic system of an internal combustion engine, said ignition system having a coil with primary and secondary circuits contained within the distributor producing a quadrature field in a substantially constant position relative to the distributor configuration, the interconnection of said coil secondary circuit and the distributor being generally inaccessible from outside the distributor, the apparatus comprising:

(a) a magnetic core;
(b) a winding on said core adapted to be connected to the analyzer for detecting ignition signals of said ignition system; and,
(c) a housing supporting said core and adapted to be mounted upon the distributor, said housing being configured such that when said housing is mounted upon the distributor said magnetic core is substantially positioned in the quadrature field with respect to the ignition coil of the particular distributor configuration whereby the signal induced by the quadrature field will be maximized and voltages induced by other magnetic fields from the engine will be minimized.

2. The apparatus of claim 1 wherein the core is shaped to maximize the available flux linkage from the quadrature field between said coil and said core whereby the signal induced by the quadrature field will be maximized and voltages induced by other magnetic fields from the engine will be minimized.

* * * * *